(12) United States Patent
Bustamante

(10) Patent No.: US 7,874,311 B1
(45) Date of Patent: Jan. 25, 2011

(54) WATER VALVE LOCKING DEVICE

(76) Inventor: Roland Bustamante, 41250 Carlotta Dr., Palm Desert, CA (US) 92211

( * ) Notice: Subject to any disclaimer, the term of this patent is extended or adjusted under 35 U.S.C. 154(b) by 814 days.

(21) Appl. No.: 11/781,076

(22) Filed: Jul. 20, 2007

Related U.S. Application Data

(60) Provisional application No. 60/869,179, filed on Dec. 8, 2006.

(51) Int. Cl.
F16K 35/00 (2006.01)
(52) U.S. Cl. ........................................ 137/382; 137/383
(58) Field of Classification Search ................. 137/382, 137/383, 385
See application file for complete search history.

(56) References Cited

U.S. PATENT DOCUMENTS

| | | | | |
|---|---|---|---|---|
| 3,626,961 A | * | 12/1971 | Quinones | 137/382 |
| 4,327,766 A | * | 5/1982 | Burke et al. | 137/382 |
| 4,428,395 A | * | 1/1984 | Bravo | 137/385 |
| 5,505,226 A | * | 4/1996 | Breth | 137/377 |
| 5,533,891 A | * | 7/1996 | Pearl et al. | 137/382 |
| 6,926,024 B2 | * | 8/2005 | McEnerney | 137/382 |
| 6,994,106 B1 | * | 2/2006 | Hackley et al. | 137/385 |
| 7,216,667 B2 | * | 5/2007 | Igarashi | 137/383 |

* cited by examiner

Primary Examiner—John Fox
(74) Attorney, Agent, or Firm—Knobbe, Martens, Olson & Bear, LLP

(57) ABSTRACT

A locking device for water valves having an actuation mechanism that couples to the water valve nut to secure the water valve. The actuation mechanism is contained within a container to limit access. The actuation mechanism is activated by a member that can be positioned in engagement with the actuation mechanism or out of engagement with the actuation mechanism. When position out of engagement with the actuation mechanism, the member can be secured to inhibit unauthorized access to the water valve nut.

6 Claims, 9 Drawing Sheets

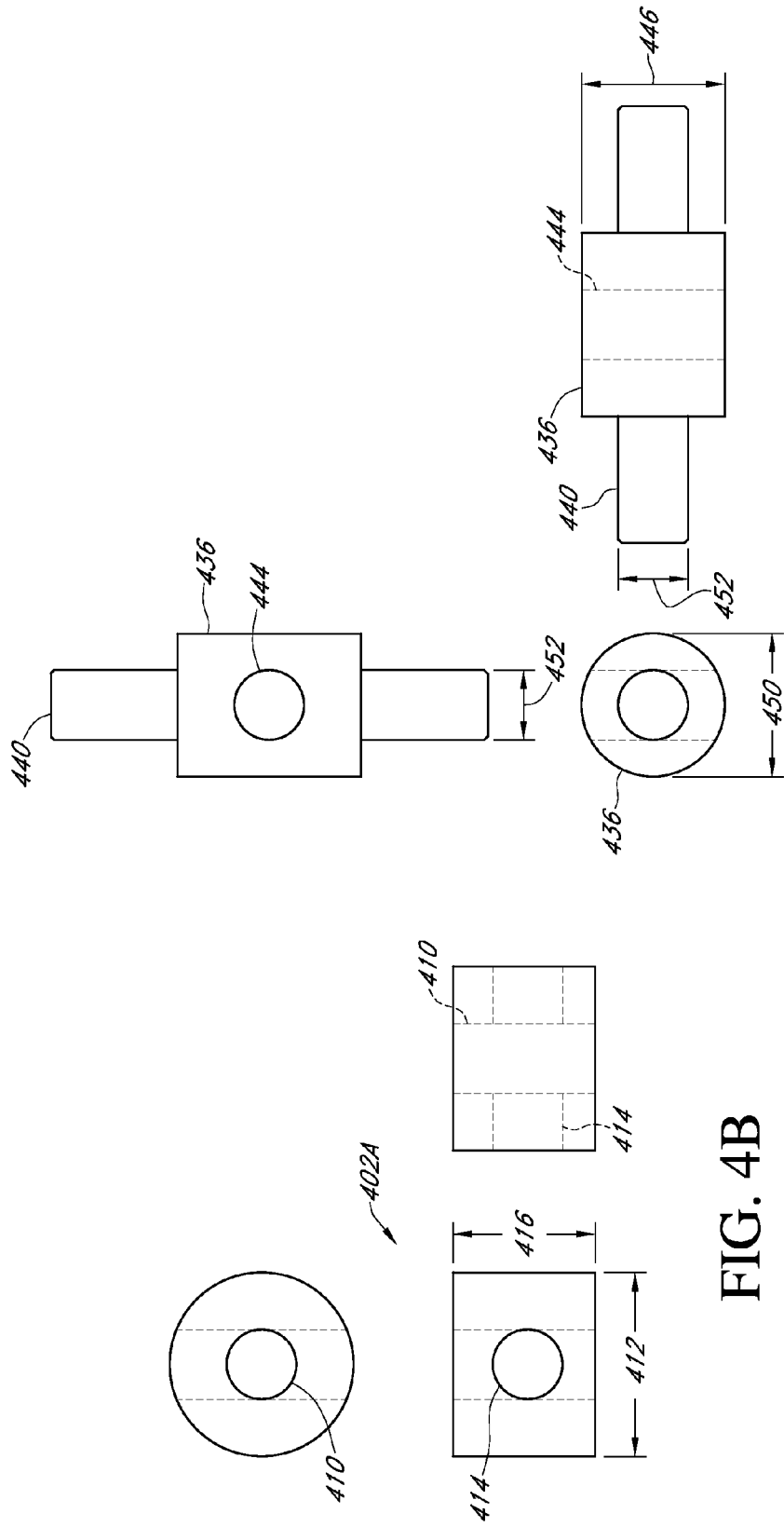

WATER VALVE LOCKING DEVICE

RELATED APPLICATIONS

This application is a non-provisional of and claims the benefit of U.S. Provisional Patent Application No. 60/869,179, filed Dec. 8, 2006, which is hereby incorporated by reference in its entirety herein.

BACKGROUND OF THE INVENTION

1. Field of the Invention

The embodiments of the present invention relate to valves and, in particular a device which may be used to secure underground valves, such as water valves, from unauthorized use.

2. Description of the Related Art

Underground valves are commonly installed throughout cities and towns to provide access to sources of water for various tasks. These values control the delivery of water to dwellings and businesses and are also used for a variety of different tasks. In one example, firefighters may use underground valves to obtain water for extinguishing a fire or municipal services, such as street sweepers and sewer maintenance trucks, often use underground valves to fill their water tanks while in the field. These valves are also used to control access of water to different locations. For example, valves are used to control water flow into specific buildings, groups of buildings and the like.

Unauthorized use and/or vandalism of underground valves, however, is common. One particular problem of unauthorized access occurs when builders access the water system. Often builders of houses, buildings and the like will connect to the water line before getting permission from the water utility so as to provide a source of water to the building or groups of buildings under construction. This can result in the loss of revenue for the water utility and can also result in contamination of the water system due to improper connection procedures.

Contamination can occur when dirt and debris in the new water system is allowed to circulate back into the existing system. Generally, newly added water systems are cleaned before allowed access to the existing system. However, when the access is unauthorized, the water utility generally is not available to ensure that the newly added system is purged. Other problems associated with unauthorized access can include a loss of overall water pressure, a loss of revenue and the like.

To inhibit unauthorized use, underground valves are commonly designed with an actuator nut. The nut is typically recessed below ground level, requiring a special tool to access the nut. In one common design, a square headed nut is used. Thus, a specially designed wrench is employed in order to engage the head of the actuator nut and open the valve of the underground valve to begin the flow of water. This design is problematic, however. The special shaped wrench or other appropriate tools are not hard to obtain. Thus, a determined individual may still open the underground valve, even if not authorized, with the attendant problems.

From the foregoing, then, it may be understood that there is a need for an improved device for securing underground water valves from unauthorized access.

SUMMARY OF THE INVENTION

The embodiments of the present disclosure provide a water valve locking device for securing an underground valve from unauthorized access. The water valve locking device comprises a generally tubular enclosure having a first end and a second end defining an interior cavity, where the cavity may be accessed from the first end. The water valve locking device further comprises a pincer mechanism positioned at least partially within the cavity adjacent to the first end of the assembly. The pincer mechanism is configured to move between a deployed position so as to grasp at least a portion of an object positioned adjacent the pincer mechanism and a retracted position so as to release an object grasped by the pincer mechanism. The water valve locking device additionally comprises a handle assembly, where the handle assembly is configured to move between an engaged position and a disengaged position, where the handle assembly may move the pincer mechanism in the engaged position and may not move the pincer mechanism in the disengaged position. The handle assembly is also reversibly lockable in the retracted position so as to inhibit actuation of the pincer mechanism.

BRIEF DESCRIPTION OF THE DRAWINGS

FIGS. 4B-4C present side and top views of the first and third pivots, respectively, of the water valve locking device of FIG. 1;

DETAILED DESCRIPTION OF THE PREFERRED EMBODIMENT

Embodiments of the present disclosure present a water valve locking device for securing underground valves. While specific geometries and dimensions of the device are discussed below, it may be understood that the exact configuration and dimensions of the device may be varied without departing from the spirit or scope of the present invention.

Figure 1B:
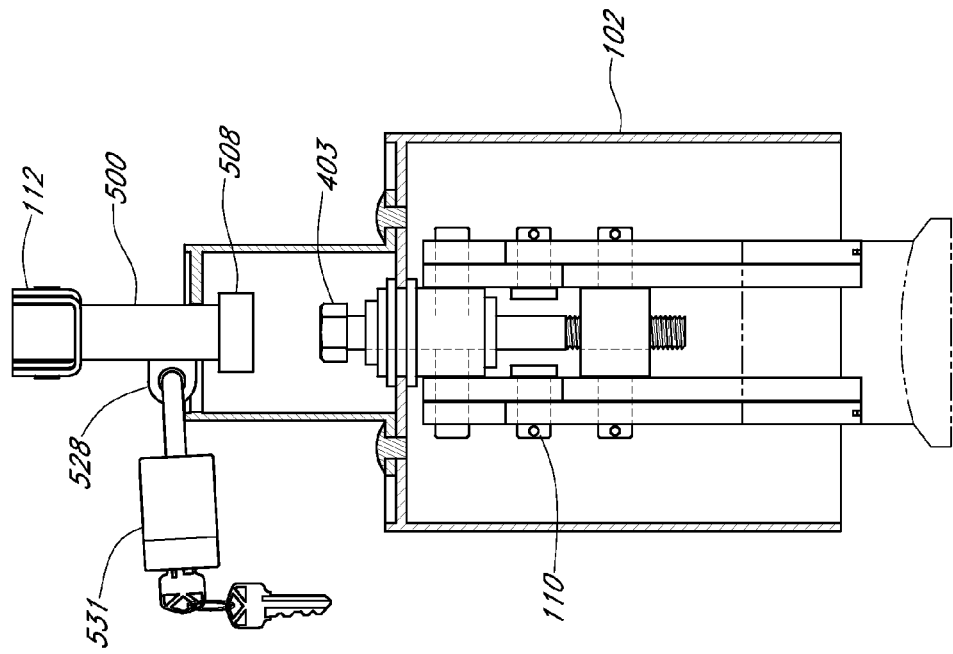
FIGS. 1A-1B present front and side views of one embodiment of a water valve locking device.
Figure 1A:
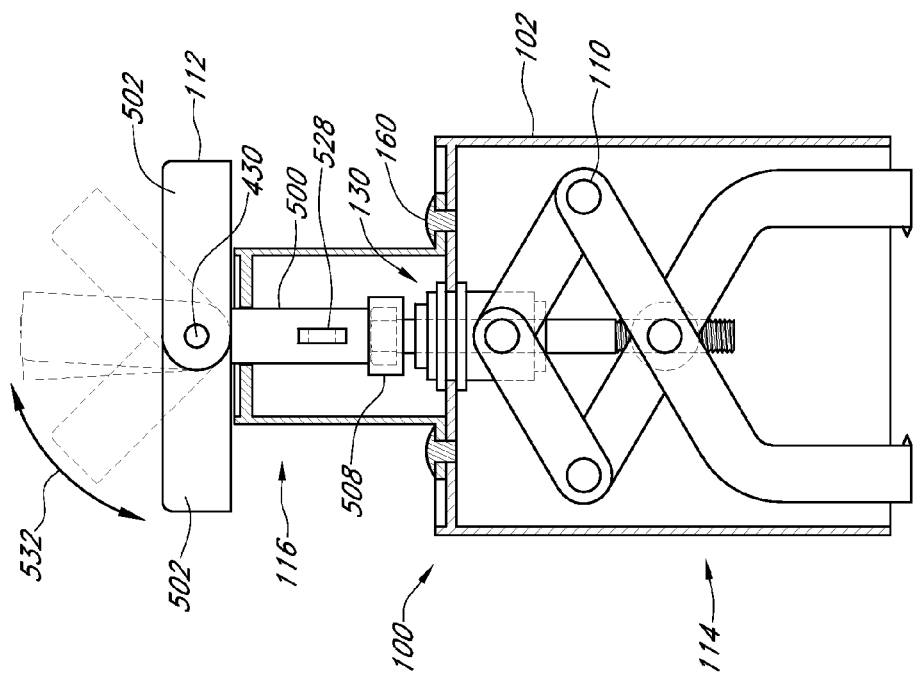

FIGS. 1A-1B illustrate front and side views of one embodiment of a water valve locking device 100 of the present disclosure for use in securing an underground valve 106 (FIG. 1C) from unauthorized access. In general, the water valve locking device 100 comprises an enclosure 102 which substantially surrounds at least a portion of the underground valve 106 (See, FIG. 6), a reversibly deployable handle assembly 112, at least a portion of which is contained within the enclosure 102, and a pincer mechanism 110, also substantially contained within the enclosure 102. When deployed, the handle assembly 112 may actuate the pincer mechanism 110, causing the pincer mechanism 110 to open and close. So configured, the underground valve 106 may be operated as usual and, subsequently, the water valve locking device 100 may be placed upon the underground valve 106, where the pincer mechanism 110 is actuated by the handle assembly 112 in order to engage the underground valve 106.

Figure 1C:
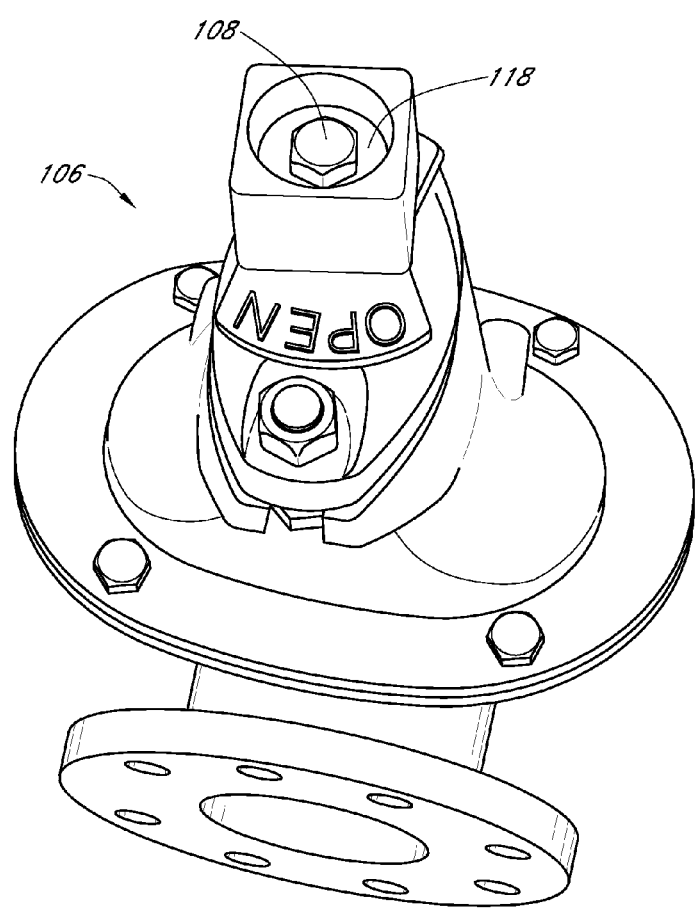
FIG. 1C presents one embodiment of an underground valve for use with embodiments of the water valve locking device of FIG. 1.

Advantageously, when mounted to the underground valve 106, the water valve locking device 100 enhances the security of the underground valve 106. When mounted, the water valve locking device 100 substantially encases and tightly grips the top of the underground valve 106 at about the nut 108 (FIG. 1C). The handle assembly 112 may be retracted and locked in place. Thus, unauthorized users are inhibited from removing the water valve locking device 100 so as to gain access to the actuator nut 108 and utilize the underground valve 106. These and other objects and advantages of the present disclosure will be discussed in greater detail below.

One embodiment of the enclosure 102 of the water valve locking device 100 is illustrated in FIGS. 1A-1B, 2A-2B, and 3A-3B. The enclosure 102 comprises a cover assembly 114 and a top cap assembly 116. The cover assembly 114 possesses a generally tubular cover assembly body 120 having a first end 122 and a second end 124. In one embodiment, the cover assembly body 120 possesses a diameter 128 of approximately 4.5 inches.

As illustrated in the embodiment of FIG. 2, a generally circular cover assembly plate 126 is positioned at about the first end 122 of the cover assembly body 120. The cover assembly plate 126 is dimensioned so as to substantially span the diameter 128 of the cover assembly body 120. For example, in one embodiment, the cover assembly plate 126 possesses a diameter 128 of about 4.5 inches and a thickness 127 of about 0.12 inches. In one embodiment, the cover assembly plate 126 is interconnected to the cover assembly body 120 using welds or other attachment methods known in the art.

A center hole 130 and a plurality of cover assembly attachment holes 132 are formed within the cover assembly plate 126. The center hole 130 is positioned in about the center of the cover assembly plate 126 and is dimensioned so as to accommodate the handle assembly 112, as discussed in greater detail below. In one embodiment, the center hole 130 possesses a diameter 129 of about 1 inch. The cover assembly attachment holes 132 are configured in a substantially circular array about the center hole 130. The cover assembly attachment holes 132 serve as a mechanism for attaching the top cap assembly 116 to the cover assembly 114, also discussed in greater detail below. In one embodiment, six such cover assembly attachment holes 132 are present, possessing a diameter 131 of about 0.26 inches.

Figure 2A:
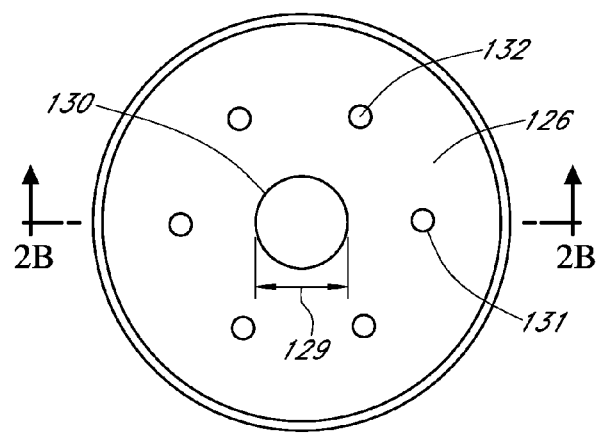
FIG. 2A presents side and top views of one embodiment of the cover assembly of the water valve locking device of FIG. 1.
Figure 2B:
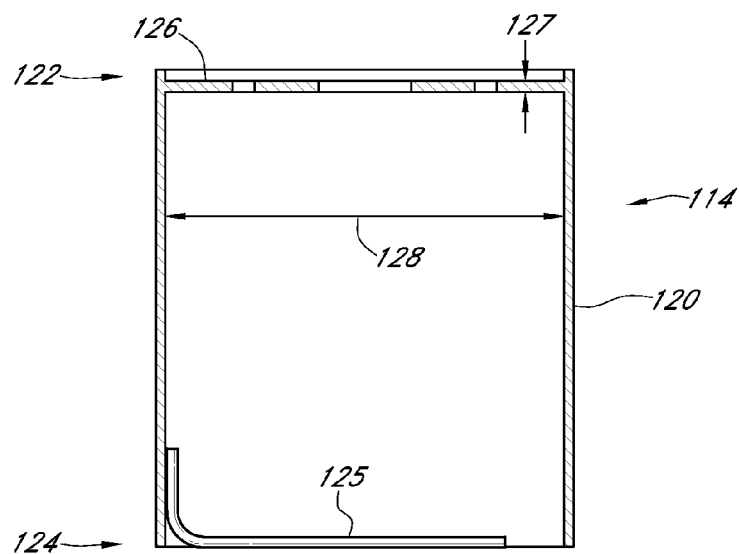
FIG. 2B presents a view of the second end of one embodiment of the cover assembly of the water valve locking device of FIG. 1, illustrating the alignment rods.
Figure 2C:
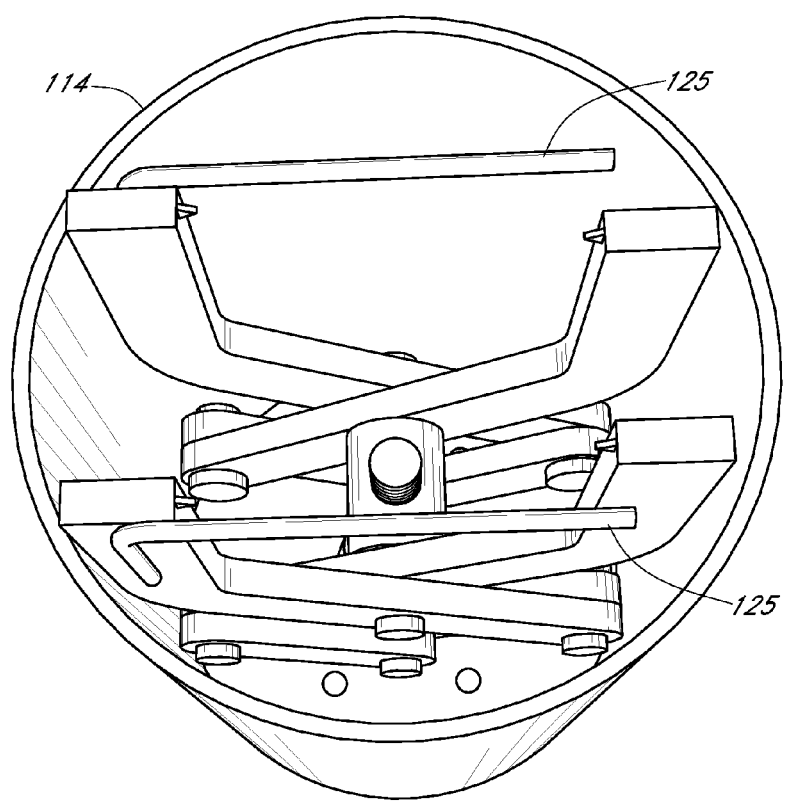
FIG. 2C presents a top view of the cover assembly of the water valve locking device of FIG. 1.

A plurality of alignment rods 125 (FIG. 2B) are also affixed to the second end 124 of the cover assembly body 120 (FIG. 2B). In one embodiment, the alignment rods 125 are generally L-shaped and extend across the cover assembly body 120. The short side of the alignment rods 125 possesses a length of approximately 1.75 inches, while the long side, extending across the cover assembly body 120 possesses a length of approximately 2.75 inches. The alignment rods 125 further possess a thickness of approximately 0.125 inches. As discussed below, in one embodiment, a pair of such alignment rods 125 are used to orient the water valve locking device 100 with respect to actuator nut 108 of the underground valve 106, facilitating mounting of the water valve locking device 100.

Figure 3A:
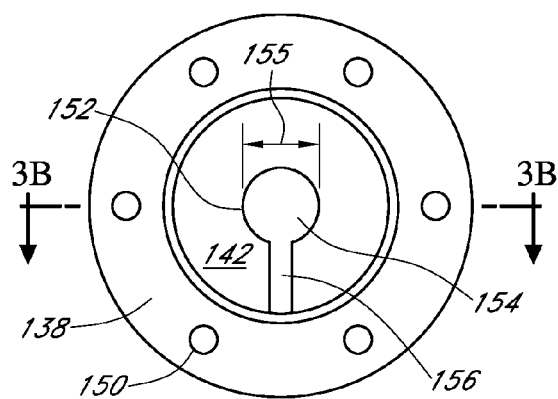
FIGS. 3A and 3B present side and top views, respectively, of one embodiment of the top cap assembly of the water valve locking device of FIG. 1.
Figure 3B:
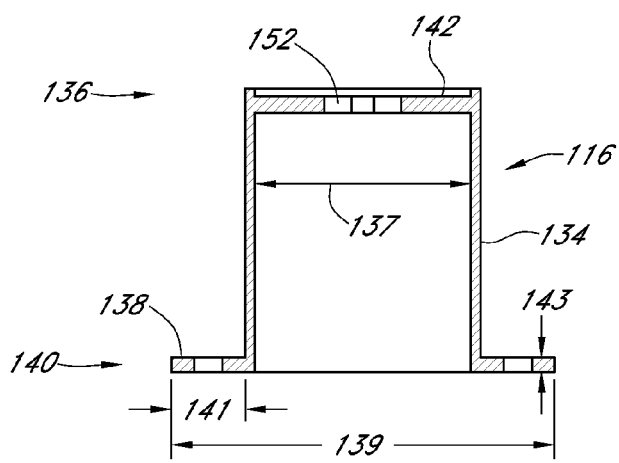

As illustrated in FIGS. 3A and 3B, the top cap assembly 116 possesses a generally tubular top cap body 134 having a first end 136 and a second end 140. In one embodiment, the top cap assembly body 134 possesses a diameter 137 of approximately 1.5 inches. A generally annular flange 138 is interconnected at about the second end 140 of the top cap body 134. The flange 138 possesses a plurality of top cap attachment holes 150 which are configured to substantially overlap with the cover assembly attachment holes 131. In one embodiment, the flange 138 substantially spans the diameter 137 of the top cap body 134, possessing an outer diameter 139 of about 1.5 inches and a width 141 of approximately 0.63 inches, and a thickness 143 of about 0.12 inches.

A generally circular top cap assembly plate 142 is positioned at about the first end 136 of the top cap assembly body 134. The top cap assembly plate 142 is dimensioned so as to substantially span the diameter 137 of the top cap body 134. For example, in one embodiment, the top cap assembly plate 142 possesses a diameter 137 of about 1.4 inches and a thickness of about 0.12 inches. In one embodiment, the top cap assembly plate 142 and flange 138 are interconnected to the top cap assembly body 134 using welding or other attachment methods known in the art.

The top cap assembly plate 142 further possesses an aperture 152. In one embodiment, the aperture 152 has a circular portion 154 connected to a generally rectangular notch portion 156 that extends from about the center of the cap 152 to the periphery of the top cap assembly plate 142. In one embodiment, the circular portion 154 of the aperture 152 possesses a diameter 155 of about 1.9 inches and the notch portion possesses a width of about 0.188 inches. As discussed in greater detail below, the aperture 152 functions both to accommodate the handle assembly 112 as well as inhibit the handle assembly 112 from being used when secured.

Returning to FIGS. 1A-1B, the top cap assembly 116 is secured upon the cover assembly 114 at about the first end 122 of the cover assembly 114. The flange 138 of the top cap assembly 116 is positioned substantially in contact with the cover assembly plate 126. The assemblies 114 and 116 are configured such that attachment holes 132 and 150 substantially overlap. This orientation forms a passage through the flange 138 and top assembly cover plate 122, allowing a securing mechanism 160 for example, nuts and bolts or rivets, to be used to secure the assemblies 114 and 116 together.

The pincer mechanism 110, illustrated in FIGS. 2C, 4A-4C, is contained within the enclosure 102. The pincer mechanism 110 comprises a threaded bolt 400, first and second pincer arms 402A, 402B, and a plurality of pincer pivots 404A, 404B, 404C. In one embodiment, two sets of arms 402A, 402B are provided, as discussed below.

Figure 4A:
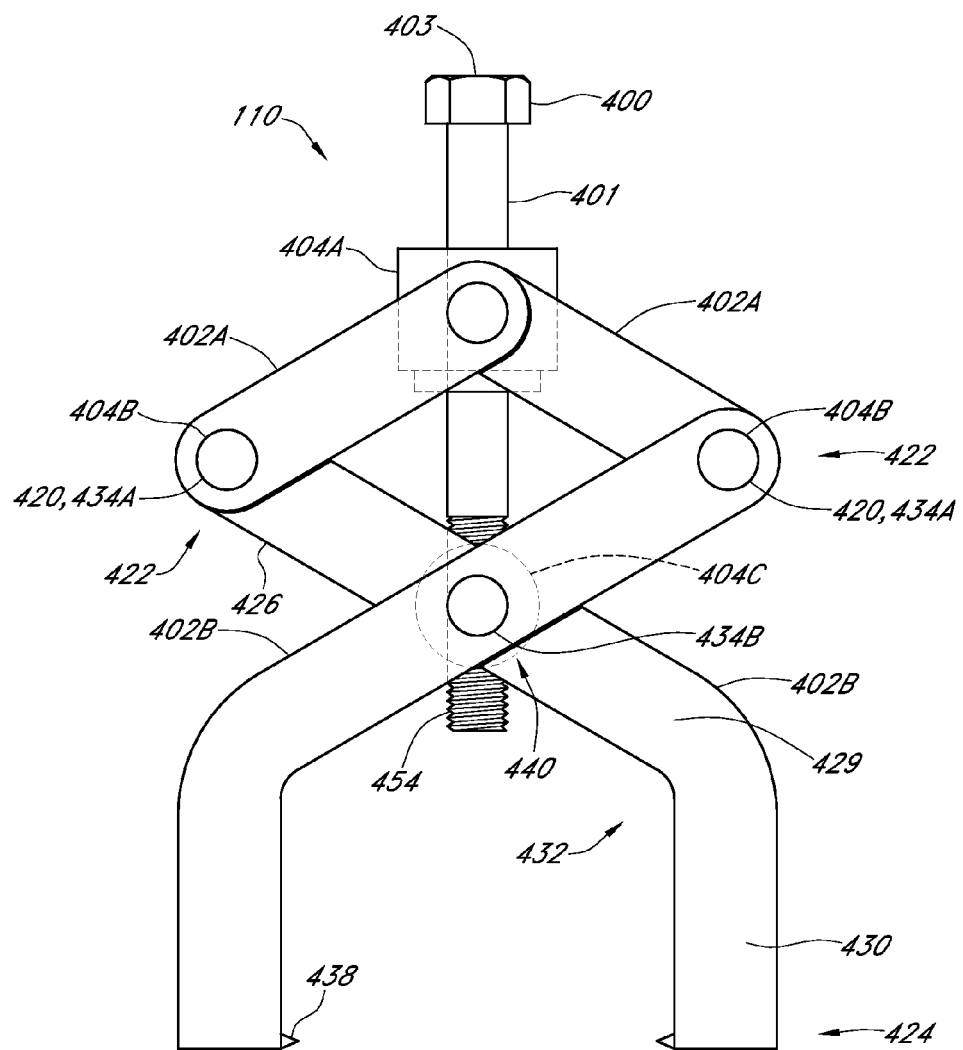
FIG. 4A presents a side view of one embodiment of the pincer mechanism of the water valve locking device of FIG. 1.

The pincer arms 402A, 402B are illustrated in FIG. 4A. The first arms 402A are generally flat and rectangular, having first arm holes 420 formed adjacent to each end of the first arms 402A. In one embodiment, the first arm holes 420 have a diameter of approximately 0.375 inches.

The first arms 402A are mounted to the first pivot 404A at one end. One embodiment of the first pivot 404A, is illustrated in FIG. 4B. The first pivot 402A is a generally circular cylinder, with a first hole 410 approximately centered on the diameter 412 of the pivot 4502A and a second hole 414 approximately centered on the width of the pivot 402A. Each of the holes 410, 414 runs through the length 416 and diameter 412, respectively, of the pivot 402A. In one embodiment, the holes 410, 414 are approximately 0.375 inches in diameter, while the length 416 and diameter 412 of the pivot 402A are approximately 1.2 and 1 inches, respectively. As illustrated in FIGS. 1A-1B, the first pivot 404A, is mounted below cover assembly plate 126 and one end of the first arms 402A are mounted to the first pivot 404A.

The opposite end of the first arms 402A are interconnected to the second arms 402B at the second pivot 404B. The second arms 402B are also generally flat and rectangular, having first and second ends 422 and 424. In one embodiment, the second arms 402 are approximately 0.63 inches wide and 0.25 inches thick. The second arms 402 possess a first portion 426 adjacent the first end 422 and a second portion 430 adjacent the second end 424. A bend 426 is formed in the second arms 402B, orienting the first and second portions 426, 430 at approximately 30° with respect to one another. In one embodiment, the first portion 430A is approximately 4 inches in length, while the second portion 430 is approximately 2 inches in length.

Spikes 438 are also provided at about the second end 424 of the second arms 402B. The spikes 438 are generally pointed and extend outward from the second arms 402B towards the center of the water valve locking device 100. As discussed in greater detail below, the spikes 438 are used to secure the water valve locking device 100 to the actuator nut 108 at the top of the underground valve 106.

A plurality of second arm holes 434A, 434B are also formed in the first portion 430A of the second arms 102B. The hole 434A is formed adjacent to the first end 422 of the second arm 402B, while the hole 434B is formed farther along the length of the second arm 402B, approximately 2 inches from the bend 426. The second arm holes 434A, 434B, in one embodiment, are approximately 0.375 inches in diameter. The second arm 402B is mounted to the first arm 402A at the second pivot 404B using the hole 434A and mounted to the third pivot 404C at about the third pivot 404C.

The third pivot 404C is illustrated in FIG. 4C. The third pivot 404C comprises a generally cylindrical tube 436 and pivot pins 440. The tube 436, in one embodiment, is approximately 1 inch in both length 446 and diameter 450. The pivot pins 440 are mounted within a portion of an interior cavity 442 of the tube, and extend outwards, substantially parallel to the cavity 442. In one embodiment, the pivot pins 440 extend approximately 0.75 inches from the ends of the tube 436 and possess a diameter 452 approximately equal to the inner diameter of the tube. A threaded through hole 444 is also formed in the tube 436, running approximately perpendicular to the cavity 442, with a diameter of approximately 0.375 inches. The pivot pins 440 provide a location where the second arms 402B are mounted to the third pivot 404C.

The bolt 400 is generally elongate, possessing a shaft 401 and a head 403. In one embodiment, the shaft 401 possesses a length of approximately 3.75 inches. The bolt 400 also possesses a threaded portion 454 extending approximately 1.5 inches. The bolt 400 is positioned in the enclosure 102 such that the head 401 sits within the top cap assembly 116, with the shaft 401 passing through the through the center hole 130 of the cover assembly plate 126 into the cover assembly 114. Within the cover assembly 114, the bolt 400 passes through the first pivot 404A at the hole 410 and is threaded within the third pivot 404C.

The configuration of the pivots 404A-404C and the bolt 400 are designed to allow the second arms 402B to actuate in a pincer-like fashion. When the rod 400 is rotated, the threaded portion 454 of the rod 400 urges the third pivot 404C to translate vertically. This translation causes the second arms 402B to rotate about the third pivot 404C, translating the first end 422 of the second arms 402B horizontally. As the first and second arms 402A, 402B are both connected to the second pivot 404B, the first arms 402A rotate about the first pivot 404A in response to the horizontal translation of the second pivot 404B. For example, when the third pivot 404C translates downwards, the second pivots 404B translate horizontally towards each other. The second ends 424 of the second arms 402B move downward and towards each other. Conversely, when the third pivot 404C translates upwards, the second pivots 404B translate horizontally away from each other. The second ends 424 of the second arms 402B move upwards and away from each other in response.

Actuation of the bolt 400 is accomplished by the handle assembly 112. FIGS. 1A-B and 5A-B illustrate one embodiment of the handle assembly 112. The handle assembly 112 comprises a handle rod 500 and handle grip 502. The rod 500 comprises a generally elongate, hollow tube having a first end 504 and a second end 506. A rod aperture 516, having a diameter 520 of about 0.25 inches, is formed through the rod 500, offset from the first end 504 of the rod by approximately 0.375 inches.

A rod head 508 is also positioned at about the second end of the rod 500. The rod head 508 is configured to engage the bolt 400, as discussed in greater detail below. In one embodiment, the rod head 508 is shaped in a hexagonal geometry so as to mate with the bolt head 403.

Figure 5B:
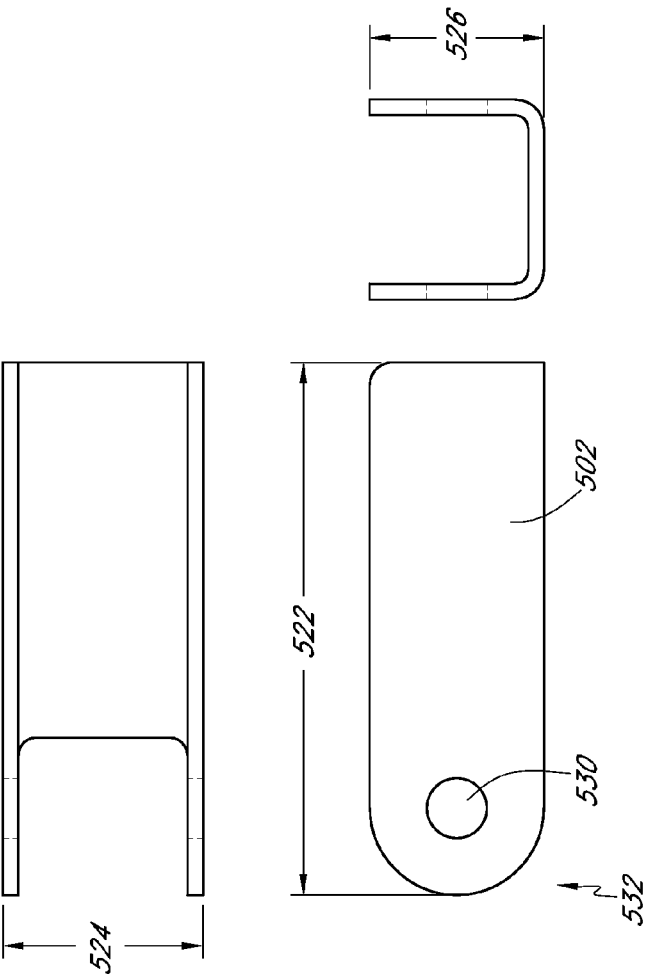
FIGS. 5A-B present side views of embodiments of the handle assembly (FIG. 5A) and handle grips (FIG. 5B) of the water valve locking device of FIG. 1.
Figure 5A:
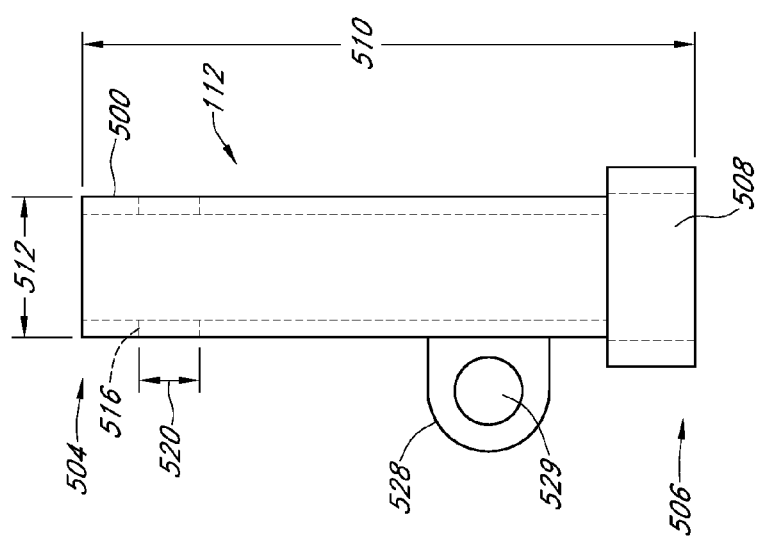

The rod aperture 516 provides a location for mounting the handle grips 502. The handle grips 502 comprise generally elongate, U-shaped structures (FIG. 5B). A hole 530 is formed at a first end 532 of the handle grip 502 which, in one embodiment, substantially spans the diameter 520 of the rod aperture 516. In one embodiment, the length 522, width 524, and height 526 of the handle grips 502 are about 2.2, 0.95, and 0.625 inches, respectively. As illustrated in FIG. 1A, a pair of handle grips 502 is mounted to the rod 500 using a pivot 530 at the rod aperture 516. So mounted, the handle grips 502 may reversibly pivot (arrow 532, FIG. 1A) between a retracted position, where the handle grips 502 are substantially parallel with the length 510 of the rod 500 and a deployed position where the handle grips 502 are substantially perpendicular to the length of the rod 500.

The rod 500 may be moved substantially vertically between an engaged position (FIG. 1A) and a disengaged position (FIG. 1B) for actuation of the pincer mechanism 110. In the engaged position, the rod 500 is extended within the top cap assembly 116, where the rod head 508 engages the bolt head 403. In this position, the handle grips 502 are deployed and the rod 400 rotated so as to rotate the bolt 400 and deploy or retract the second arms 402B of the pincer mechanism 110. In the disengaged position, the rod 500 is retracted from the bolt 400, with the majority of the rod 500 extending outside the top cap assembly 116.

In one embodiment, the handle assembly 112 is further configured so as to secure the rod 500 in the disengaged position. A lock tab 528, comprising a generally U-shaped band, extends outward from the rod 500, approximately perpendicular to the length 510 of the rod 500. The tab 528 and rod 500 also define a space 529 where a lock 531 may be fastened. The ring 528 is dimensioned so that it may pass through the aperture 152 of the top cover assembly 152. Thus, absent a lock, the rod 500 may freely move between the engaged and disengaged positions. When a lock 531 affixed to the tab 528, however, the tab 528 is substantially inhibited from passing through the aperture 152 of the top cover assembly 152, constraining the rod 500 in the disengaged position.

Figure 6:
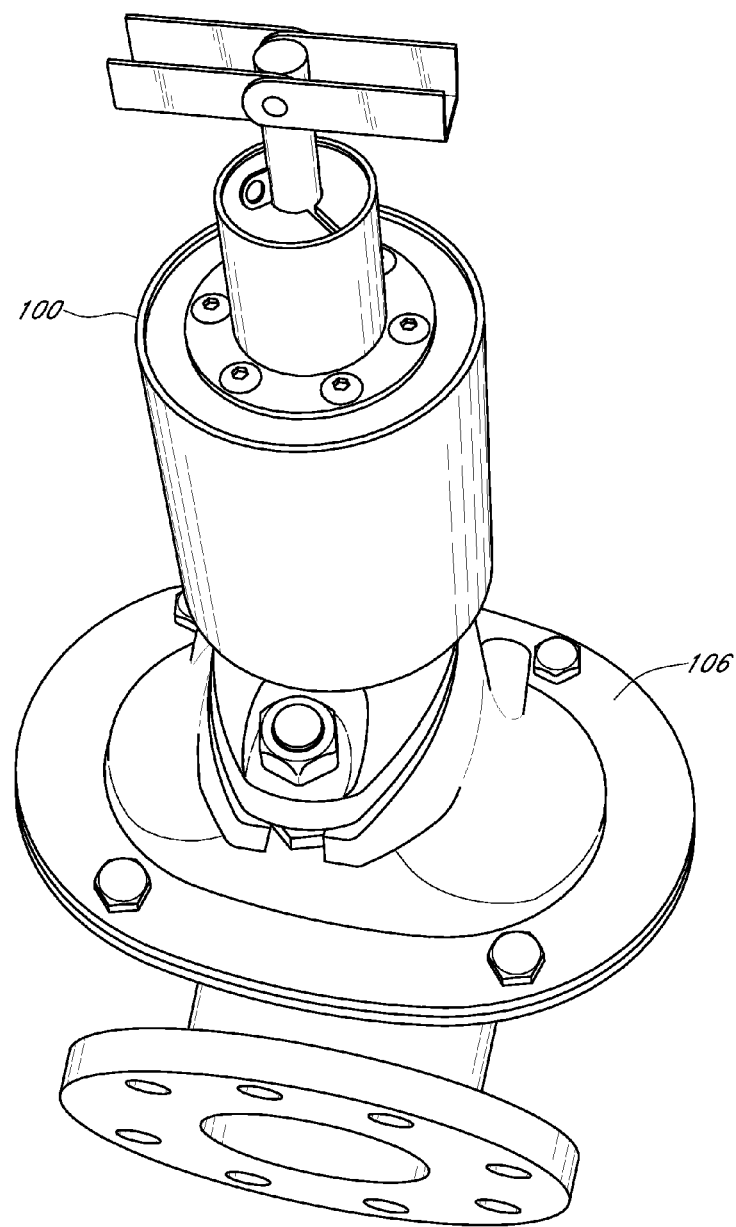
FIG. 6 presents the water valve locking device of FIG. 1 in use with an underground valve.

The water valve locking device 100 is illustrated in use with the underground valve 106 in FIG. 6. The water valve locking device 100 is used in the following manner. The actuator nut 108 of the underground valve 106 is adjusted so as to deliver a desired volume of water which can vary from no water to a selected amount of water. Subsequently, the water valve locking device 100 is placed over the underground valve 106 and aligned such that the alignment rods 125 are positioned approximately parallel to opposing faces of the actuator nut 108. The handle assembly 112 is then unlocked, if locked, and the rod 400 is extended within the top cap assembly 116 to engage the bolt 403. The bolt 403 is rotated with the handle assembly 112 so as to deploy the pincer mechanism 110. The second arms 402B move downwards and inwards so as to contact opposing faces of the actuator nut 108. The spikes 125 allow the second arms 402B to bite into the actuator nut 108 sufficiently to provide a strong grip on underground valve 106.

Once the second arms 402B have engaged with the bolt 403, the rod head 508 is disengaged from the bolt 403 by lifting the rod 500 upward via the handles 502 until the lock tab 528 has been fully removed from the top cap body 134 via the rectangular portion 156 of the opening 152. A lock 531 can then be installed on the lock tab 528 which inhibits engagement of the rod head 508 and the bolt 403 as they are now physically separated and secured in this physically separated state.

In this way the assembly secures the underground valve. Access to the valve nut 108 is prevented as the valve nut is encased within the enclosure 102. Removal of the assembly 100 from the valve is inhibited due to the engagement of the arms 400 to the valve nut 108. Disengagement of the arms 400 from the valve nut 108 is inhibited as a result of the valve nut being encased in the in the enclosure 102 and as a result of the rod head 508 being locked in a separated position from the bolt 403 where the bolt 403 is also non-accessible as a result of being positioned within the upper cap 116.

Advantageously, the design of the water valve locking device 100 allows the underground valve 106 to be secured quickly and easily. As illustrated above, the user just needs to align the water valve locking device 100 with respect to the underground valve 106 and tighten the pincer mechanism 110 with the handle assembly 112 to secure the water valve locking device 100 in place. The alignment rods 125 properly orient the water valve locking device 100 so that the second arms 402B of the pincer mechanism 110 are substantially perpendicular to a pair of opposing faces of the actuator nut 108. This allows the pincer mechanism 110 to establish a firm grip on the underground valve 106 which is substantially resistant to slippage. Thus, no special training is required to successfully employ the water valve locking device 100.

In a further advantage, the water valve locking device 100 is capable of working with a large variety of underground valves 106. While the size of the actuator nut 108 is generally standardized at about 2 inches, a well 118 which recesses the nut 108 is not, resulting varying clearance between the well 118 and the nut 108. The configuration of the pincer mechanism 110, however, allows the second arms 402B to be adjusted so as to be positioned within the recess formed by the well 118. Thus, the water valve locking device 100 may be used with underground valves 106 of varying size.

In an additional advantage, the water valve locking device 100 provides flexible, portable security. The water valve locking device 100 may be reversibly secured to the underground valve 106, allowing it to be used repeatedly and at different locations.

In another advantage, the water valve locking device 100 allows the underground valve 106 to be secured in an effective manner. The pincer mechanism 110 grips the actuator nut 108 with a high level of force. This force is sufficient to substantially inhibit the water valve locking device 100 from being dislodged from the underground valve 106 once secured in place.

In another aspect, a common lock, such as a combination lock or key lock may be used to secure the rod 500 in the disengaged position. Authorized users need only unlock and remove the lock in order to engage the handle assembly 112 and actuate the pincer mechanism 110. Furthermore, the ease of securing water valve locking device 100 in place increases the probability that the water valve locking device 100 will be secured after each use, enhancing the effectiveness of the water valve locking device 100.

Although the foregoing description has shown, described, and pointed out the fundamental novel features of the present teachings, it will be understood that various omissions, substitutions, and changes in the form of the detail of the apparatus as illustrated, as well as the uses thereof, may be made by those skilled in the art, without departing from the scope of the present teachings. Consequently, the scope of the present teachings should not be limited to the foregoing discussion but should be defined by the appended claims.

What is claimed is:

1. A device for securing a water valve having an actuating nut, the device comprising:

an engagement assembly having at least two arms that are adapted to engage with the actuating nut, wherein the engagement assembly further includes a bolt that is coupled to the at least two arms so that movement of the bolt in a first direction results in outward movement of the two arms thereby releasing the engagement with the actuating nut on the water valve and movement of the bolt in a second direction opposite the first direction results in inward movement of the two arms thereby allowing the at least two arms to engage the actuating nut of the water valve from at least two sides;

a first container having a first and a second end, wherein the engagement assembly is mounted within the first container and wherein first container has an opening at the first end that is sized so as to permit the engagement assembly to engage with the actuating nut of the water valve and wherein the first container at a second end has an opening that allows access to the bolt for movement in the first and second directions;

a second container having a first and a second end wherein the second end of the second container is coupled to the second end of the first container and wherein the first end of the second container includes an opening allowing access thereto;

a rod that has a first and a second end that is coupled to the second container so as to be movable between a first position and a second position, wherein the first end of the rod engages with the bolt of the engagement assembly in the first position so that user manipulation of the rod results in movement of the bolt of the engagement assembly in the first or second directions and wherein the first end of the rod is disengaged with the bolt of the engagement assembly in the second position; and a securing mechanism that secures the rod in the second position thereby inhibiting manipulation of the engagement assembly by the user when the rod is secured in the second position.

2. The device of claim 1, wherein the first container is configured to inhibit access by a user to the actuating nut of the water valve when the engagement assembly is engaged with the actuating nut.

3. The device of claim 1, wherein the second container is configured to inhibit access by a user to the bolt of the engagement assembly.

4. The device of claim 1, wherein the engagement assembly includes the first arm and the second arm which are coupled together at a pivot point and a threaded member that is positioned at the pivot point wherein a threaded end of the bolt engages with the threaded member.

5. The device of claim 4, wherein the engagement assembly further comprises a carrier that is fixably coupled to the bolt and a pair of pivoting members that are pivotally attached to the carrier and the first and second arms.

6. The device of claim 5, wherein the first and second arms interlace with each other and are pivotally coupled together at a mid-point at the pivot point.

\* \* \* \* \*